US008454282B2

(12) United States Patent
Strahm et al.

(10) Patent No.: US 8,454,282 B2
(45) Date of Patent: Jun. 4, 2013

(54) FIXTURE AND METHOD FOR MOUNTING ANGLED MACHINE HEAD ON A MACHINE TOOL

(75) Inventors: Loren J. Strahm, Florissant, MO (US); Randolph B. Hancock, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 1312 days.

(21) Appl. No.: 12/182,046

(22) Filed: Jul. 29, 2008

(65) Prior Publication Data
US 2010/0025907 A1 Feb. 4, 2010

(51) Int. Cl.
*B23C 1/12* (2006.01)
*B23B 51/00* (2006.01)
*F16C 11/00* (2006.01)

(52) U.S. Cl.
USPC ........... 409/211; 409/144; 409/215; 408/186; 408/238; 403/113

(58) Field of Classification Search
USPC ................. 409/201, 211, 216, 230, 144, 204, 409/215; 82/120, 121, 158–161; 279/5, 8; 408/146, 186, 238, 239 R; 403/113, 116
See application file for complete search history.

(56) References Cited

U.S. PATENT DOCUMENTS

| | | | | |
|---|---|---|---|---|
| 2,445,039 | A | * | 7/1948 | Rusnok ........................ 409/201 |
| 4,305,189 | A | * | 12/1981 | Miyakawa .................... 409/230 |
| 4,365,916 | A | * | 12/1982 | Miyakawa .................... 409/144 |

OTHER PUBLICATIONS

CTL Centreline, "Product Information," "Heavy Duty Right Angle Head," http://www.ctl-centreline.com, last accessed on Jul. 24, 2008.
CTL Centreline, "Product Information," "Specials examples of custom solutions," http://www.ctl-centreline.com, last accessed on Jul. 24, 2008.

* cited by examiner

*Primary Examiner* — Teresa M Ekiert
(74) *Attorney, Agent, or Firm* — Hanley, Flight and Zimmerman, LLC

(57) ABSTRACT

A fixture is used to mount an angled machine head on a machine tool. The fixture includes a base adapted to be mounted on the machine tool, and a collar for holding the angled machine head. The collar is mounted for rotation on the base and allows the angled machine head to be rotated to any of a plurality of rotational positions. The collar may be selectively locked to the base to fix the position of the angled machine head.

14 Claims, 6 Drawing Sheets

FIXTURE AND METHOD FOR MOUNTING ANGLED MACHINE HEAD ON A MACHINE TOOL

TECHNICAL FIELD

This disclosure generally relates to machine tools, and deals more particularly with a fixture for mounting an angled machine head on a machine tool.

BACKGROUND

A wide variety of machine tools are available for performing turning, drilling and milling operations in which a tool is fed into a workpiece by relatively moving the tool and the workpiece. In some cases, the tool is moved relative to the workpiece, while in other cases, the workpiece is moved relative to the tool.

In some applications, the machine tool may have limited ability to perform machining in tight spaces, such as small radii in highly contoured or complex parts. In order to solve this problem, a retrofit accessory known as an angled machine head may be mounted on the machine tool in order to provide the capability needed to machine within tight spaces. These angled machine heads, the most common of which is a right angle head, are often mounted directly on the drive spindle that is normally used to drive the tool. The drive spindle must be locked against rotation when the angled machine head is used, and thus provides only as a means of mounting, rather than driving, the angled machine head.

Some machine tools may not possess the capability of locking the drive spindle against rotation, consequently a problem exists in mounting an angled machine head on this type of machine tool since the angled machine head would be free to rotate along with the rotating drive spindle.

Accordingly, there is a need for a fixture and related method of mounting an angled machine head on a machine tool of the type that may not lock up the tool spindle. There is also a need for a fixture and method of the type mentioned that allows the angled machine head to be rotationally indexed and then fixed in a desired position, in order to orient the tool.

SUMMARY

In accordance with the disclosed embodiments, a fixture and method are provided for mounting an angled machine head on any of a variety of machine tools having the capability of relatively moving a tool and a workpiece along orthogonal axes, including those that may not possess the capability of locking the drive spindle against rotation. The fixture may be used to mount a variety of angled machine heads though the provision of shims that may be customized for each application.

According to one disclosed embodiment a fixture for mounting an angled machine head on a machine tool, comprises: a base adapted to be mounted on a machine tool; a collar for holding the angled machine head; and, means for selectively locking the collar against rotation on the base. The rotatable collar allows the angled machine head to be indexed to any of a plurality of rotational positions. The collar includes arcuate slots therein, and the locking means includes releasable fasteners that pass through the slots into the base. The fixture may further include shims located between the angled machine head and the collar for fitting and securing the angled machine head within the collar.

According to another disclosed embodiment, a fixture is provided for mounting an angled machine head on a machine tool having a spindle rotatable about a reference axis. The fixture comprises: a base; first mounting means for mounting the base on a machine tool in the area of the spindle; and, second mounting means for rotatably mounting the angled machine head on the base, including means for locking the angled machine head in any of a plurality of rotational positions respectively representing differing working orientations of the angled machine head. The second mounting means may include a collar and shims between the collar and the angled machine head. The collar may include curved interior walls. The shims may have a curve side engaging curved walls of the collar and a substantially flat side engaging the angled machine head. The second mounting means may include a flange that engages the base and has arcuate slots therein, and the locking means may include fasteners passing through the slots into the base for drawing the flange against the base.

According to still another embodiment, machining apparatus adapted to be mounted on a machine tool of the type producing relative movement between a tool head and a workpiece, comprises: an angled machine head adapted to have a tool mounted thereon for machining the workpiece; a mounting assembly for rotatably mounting the angled machine head on the tool head, including means for locking the angled machine head in a desired rotational position on the tool head; and, a drive system independent of the machine tool for driving the angled of the machine head.

According to a disclosed method embodiment, mounting an angled machine head on a machine tool, comprises: fixing an angled machine head in a collar; mounting the collar for rotation on a base; mounting the base on a spindle head of the machine tool; rotating the collar until the angled machine head is positioned in a desired working orientation; and, locking the collar against rotation when the angled machine head has been positioned in the desired working orientation.

The disclosed embodiments satisfy the need for a fixture and method for mounting an angled machine head on machine tools, including machine tools in which the drive spindle may not be locked against rotation.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
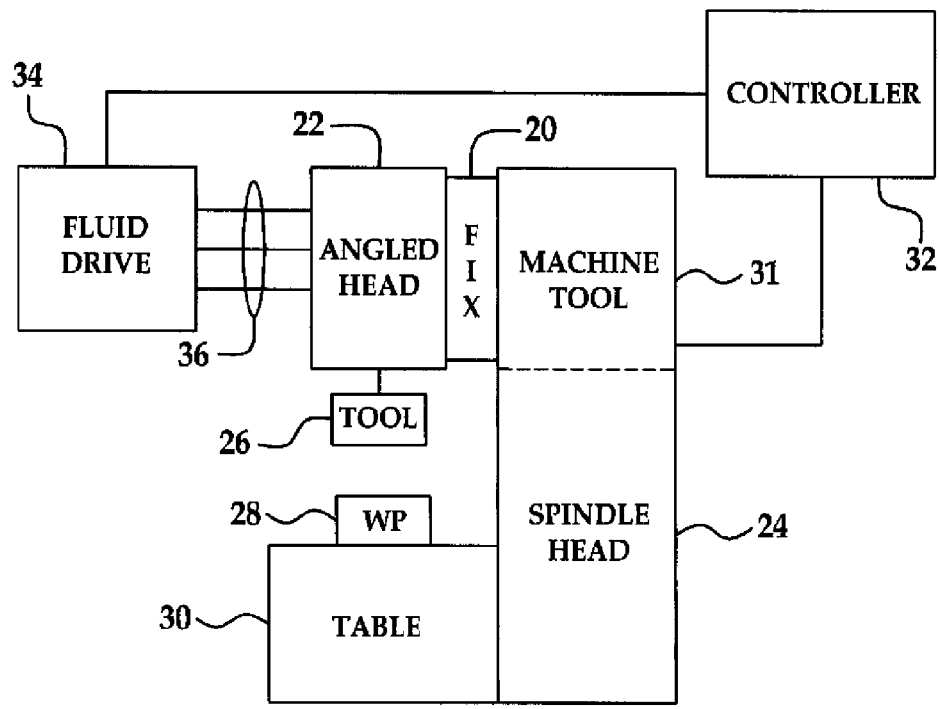
FIG. 1 is a functional block diagram showing illustrating the use of a fixture to mount an angled machine head on a machine tool.

Referring first to FIG. 1, the disclosed embodiments relate to a fixture 20 used to mount an angled machine head 22 on a machine tool 24. The angled machine head 22 has a tool 26 mounted thereon for machining a workpiece 28 supported on a table 30 forming part of the machine tool 24. Depending upon the type of machine tool 24, the table 30 may move relative to the tool 26, or the table 30 may remain stationary while a portion of the machine tool 24 such as a spindle head 31 moves the angled head 20, and thus the tool 26, relative to the workpiece 28.

The angled machine head 22 may be powered by a fluid drive system 34 that may be independent of the machine tool 24 and is coupled to the angled machine head 22 by fluid lines 36. The operation of the fluid drive 34 and the machine tool 24 may be controlled by one or more digital controllers 32, which may be, for example and without limitation, NC or CNC controllers.

Figure 2:
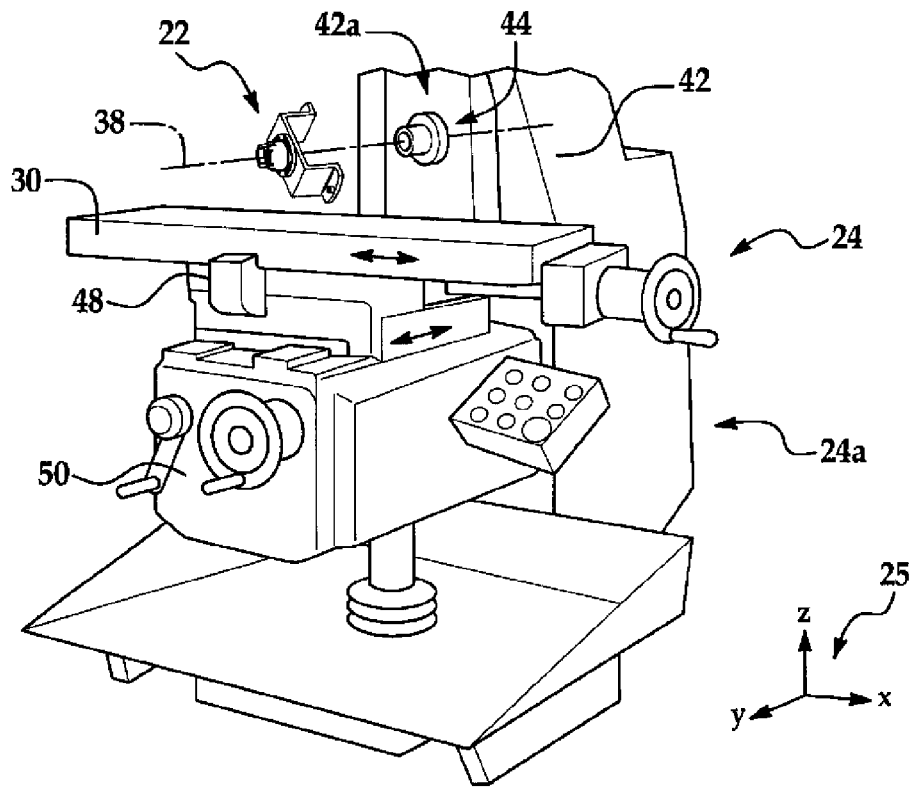
FIG. 2 is a perspective illustration of a typical machine tool showing the fixture positioned to be mounted on the machine tool.

The machine tool 24 may comprise any of a wide variety of machines having components such as the table 30 and spindle head 31, that produce relative movement between a tool 26 and a workpiece 28. For example, referring to FIG. 2, the machine tool 24 may comprise a horizontal mill 24a that includes a column 42 for supporting a spindle assembly 44 that rotates an arbor (not shown) upon which a cutting tool (not shown) is mounted. For sake of clarity, an overarm (not shown) and arbor bracket (not shown) have been removed from the mill 24a shown in FIG. 2. The mill 24a further includes a table 30 upon which the workpiece 28 (FIG. 1) is mounted. The table 30 is supported on a saddle 48 which in turn is mounted on a vertically displaceable knee 50 disposed in front of the column 42. The spindle assembly 44 and column 42 remain stationary while the assembly of the table 30, saddle 48 and knee 50 move the workpiece (not shown) along orthogonal X, Y and Z axes within the machine tool's coordinate system 25. In other types of machine tools, a portion of the column 42, and thus the spindle assembly 44, may be moveable along the axes of the coordinate system 25, while the workpiece remains stationary.

In one embodiment, the fixture 22 is mounted on a forward face 42a of the column 42, overlying the spindle assembly 44 such that a central rotational axis 38 of the fixture 22 is substantially axially aligned with the central axis (not shown) of the spindle assembly 44. In other embodiments, however, the fixture 22 may be mounted on other areas of the column 42, as will be discussed below in more detail.

Figure 3:
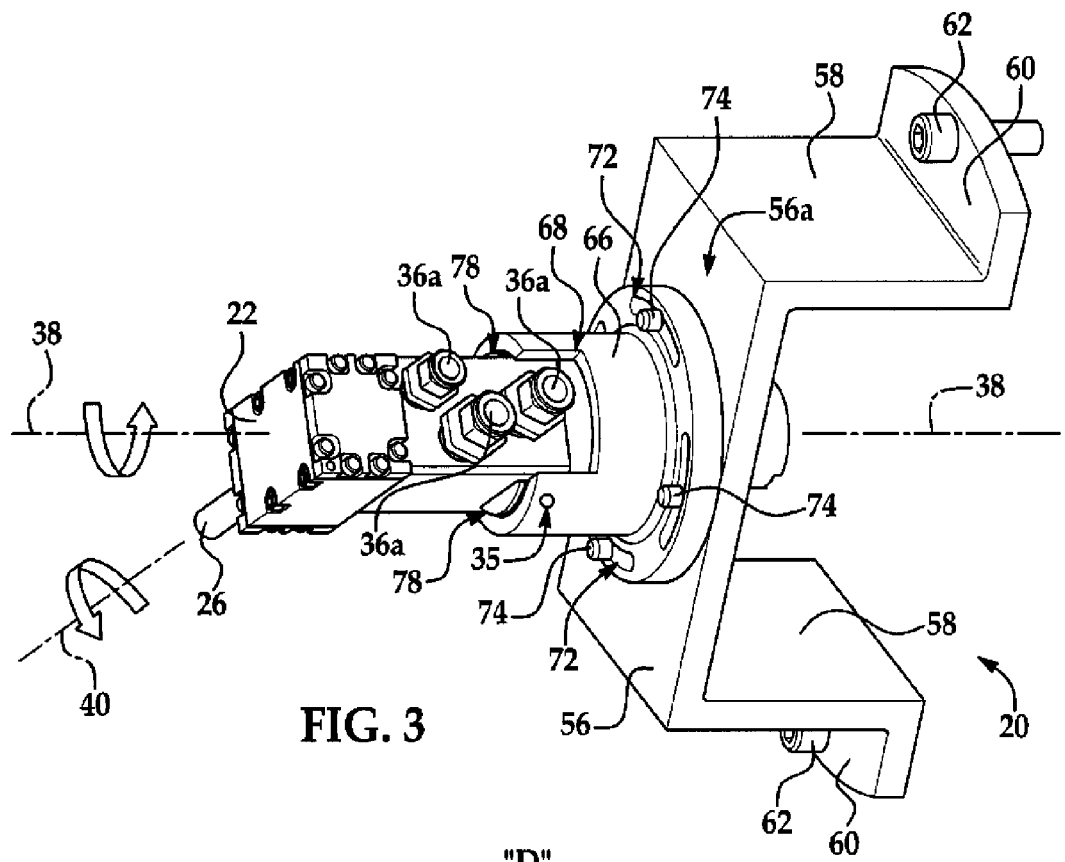
FIG. 3 is a perspective illustration of the fixture with an angled machine head mounted thereon.
Figure 4:
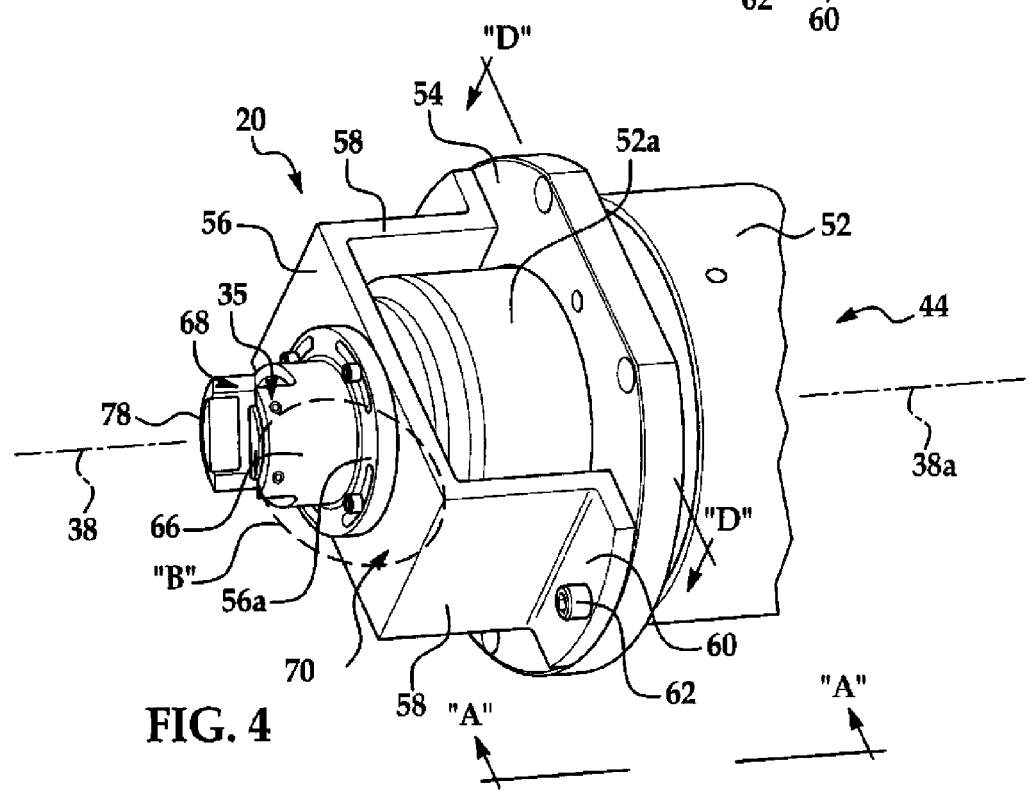
FIG. 4 is a perspective illustration of the fixture mounted on a spindle assembly forming part of the machine tool shown in FIG. 2.
Figure 5:
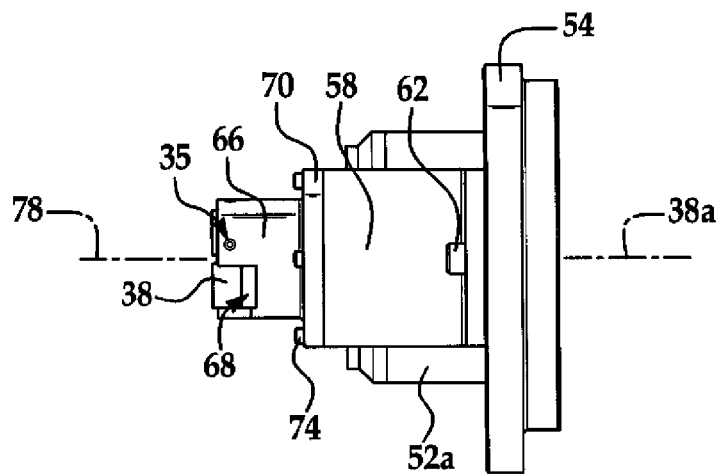
FIG. 5 is an illustration of a view in the direction designated as "A" in FIG. 4.

Referring now to FIG. 3, the fixture 20 broadly comprises a collar 66 rotatably mounted on a base 56. The exact shape and configuration of the base 56 will depend upon the application, but in the illustrated example, the base 56 is substantially U-shaped and includes a pair of legs 58 each having an outwardly turned flange 60. The angled machine head 22 is received within cutouts 68 in the collar 66 and may be rigidly fitted within the collar 66 by means of shims 78.

The disclosed embodiments illustrate a right angled head 22 wherein the tool 26 rotates about an axis 40 that is orthogonal to the rotational axis 38 about which the head 22 may be rotated in the fixture 20. However, other forms of angled machine heads may be employed in which the angle between axes 38 and 40 may be other than 90 degrees, such as, for example and without limitation, 45 degrees. The previously discussed fluid drive 34 (FIG. 1) is connected by fluid lines 36 (FIG. 1) to fluid couplings 36a on the angled machine head 22. In the illustrated example, two of the fluid couplings 36a represent supply and return fluid paths, while the third fluid coupling 36a provides lubricating fluid to internal bearings (not shown) forming part of the angled machine head 22.

FIGS. 4-9 illustrate one mounting arrangement in which the fixture 20 is mounted on the spindle assembly 44. Spindle assembly 44 includes a spindle motor 52 having a forward portion 52a protruding from an annular flange 54 that is secured to the face 42a of the column 42 shown in FIG. 2. The flanges 60 on the base 56 may be removably secured to the annular flange 54 by means of screws 62. In the illustrated example, the rotational axis 38 of the fixture 20 is substantially aligned with the central axis 38a of a rotating spindle (not shown) forming part of the spindle assembly 44. However, as previously mentioned, the fixture 20 need not be arranged such that the rotational axis 38 is coaxial with the rotating spindle.

Figure 8:
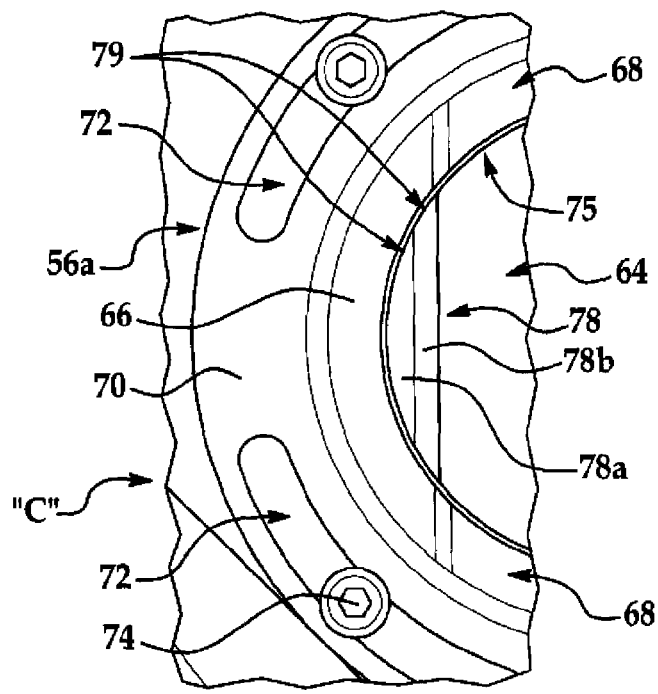
FIG. 8 is an enlarged illustration of the area designated as "C" in FIG. 7.
Figure 9:
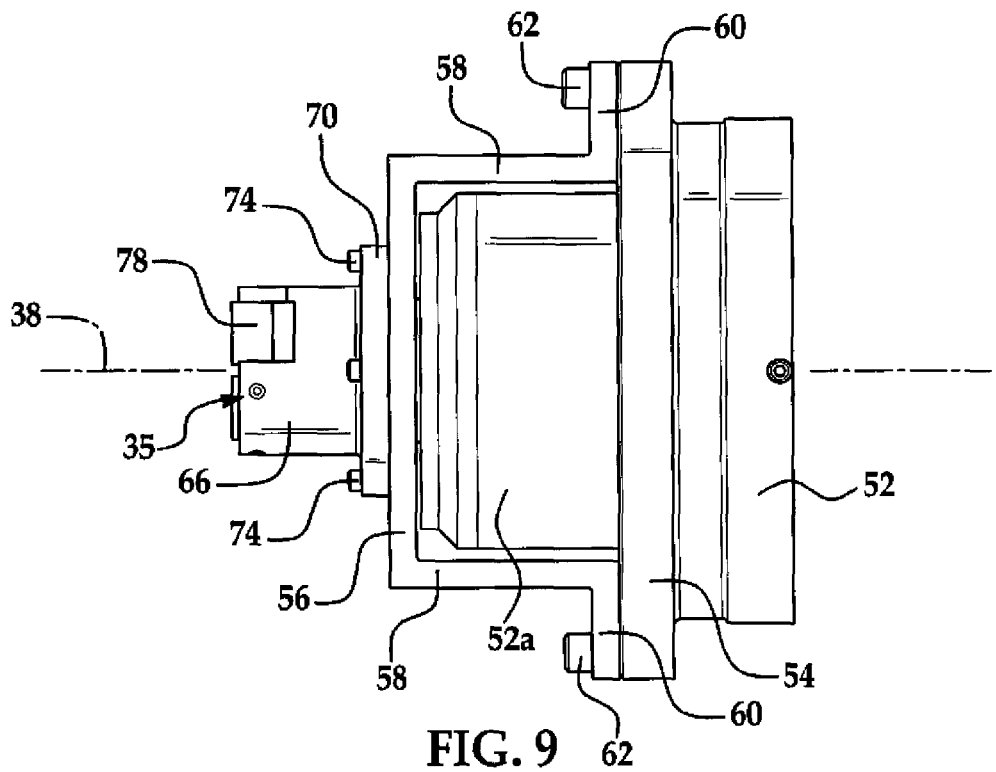
FIG. 9 is an illustration of a view in the direction designated as "D" in FIG. 4.

In the illustrated example, the collar 66 comprises a substantially hollow cylinder which includes, as best seen in FIG. 8, curved interior walls 75. The cutouts 68 are formed in opposite sides of the collar 66, and are generally rectangular in shape, substantially matching the profile of the angled machine head 22. Other shapes for the cutouts 68 are possible, depending on the profile of the particular angled machine head 22. The shims 78 may comprise a pair of shaped shim members 78a, 78b having surfaces 79 that are curved to fit the shape of the inside walls 75 of the collar 66. The thickness and number of the shims 78 will depend upon the width of the angled machine head 22. Set screws 35 pass through the collar 66 and bear against the shims 78, and provide a means of forcing the shims 78 against the angled machine head 22. The shims 78 provide a means of closely fitting differing angled machine heads 22 within the collar 66 and/or accommodating variations in the dimensions of the angled machine head 22, while the set screws 35 allow slight displacement of the shims 78 in order to close any remaining gap and secure the shims 78 against the angled machine head 22.

Figure 6:
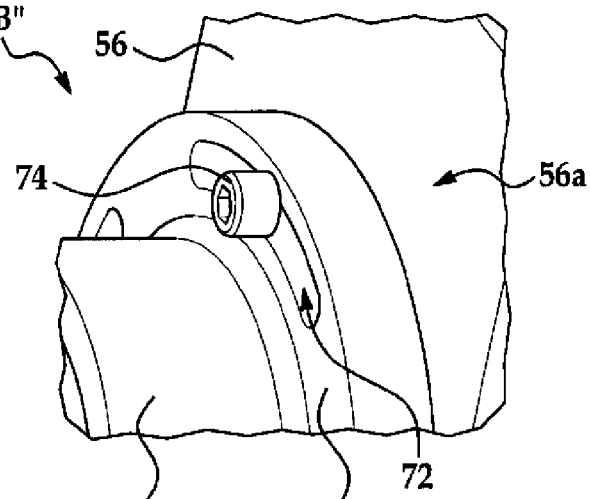
FIG. 6 is an enlarged, perspective illustration of the area designated as "B" in FIG. 4.
Figure 7:
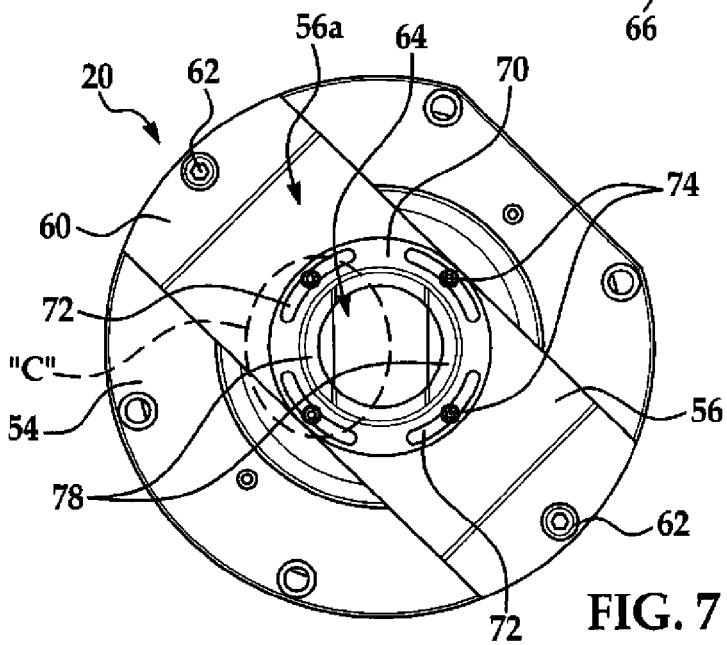
FIG. 7 is a plan illustration of the fixture mounted on the spindle assembly.

As best seen in FIGS. 6 and 8, the collar 66 includes an outwardly turned, annular flange 70 that engages the face 56a of the base 56. The flange 70 includes a plurality of arcuately shaped slots 72 therethrough. Fasteners 74 such as cap screws pass through the slots 72 and are received in the base 56. The fasteners 74 provide a means of drawing down the collar 70 against the base 56, thereby locking the collar 66 against rotation. Loosening of the fasteners 74 allows the collar 66 to rotate through an angle determined by the length of the slots 72.

Figure 10:
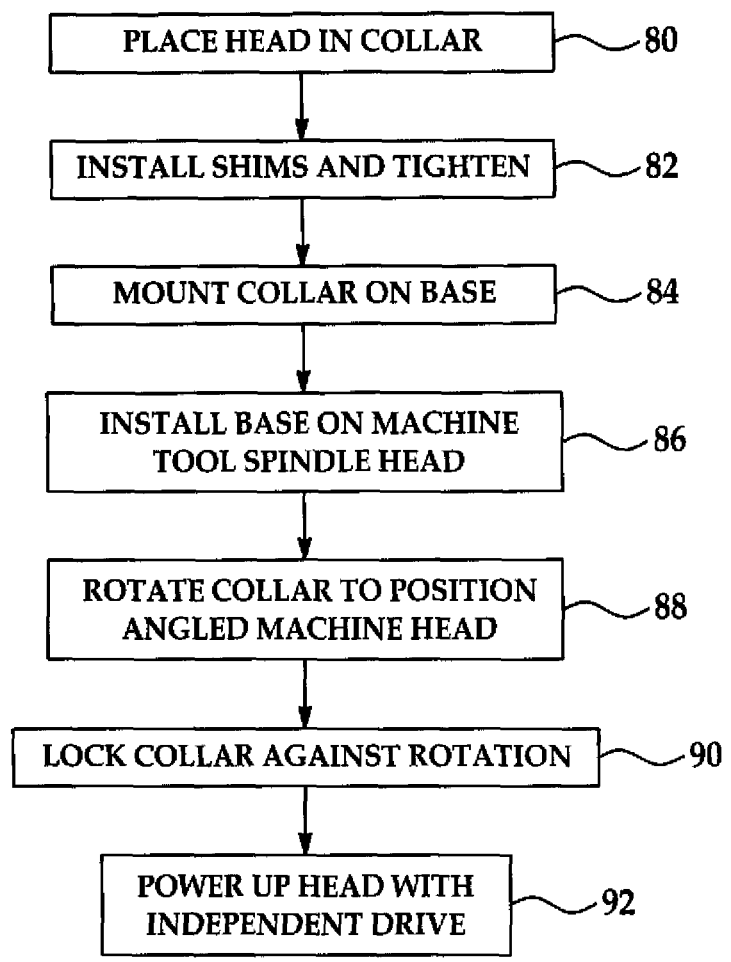
FIG. 10 is a flow diagram illustrating a method for mounting an angled machine head on a machine tool.

Attention is now directed to FIG. 10 which broadly illustrates the steps of a method of mounting the fixture 20 on the machine tool 24. Beginning at 80, the angled machine head 22 is placed within the cutout 68 in the collar 66. Next, at step 82, the shims 78 are installed between the angled machine head 22 and the interior walls 75 of the collar 66. The shims 78 are forced tightly against the angled machine head 22 by tightening the set screws 36 (FIGS. 4 and 5) which load the shims 78 against the sides of the angled machine head 22.

Next, at step 84, the collar 66 is mounted on the base 56 by installing the fasteners 74. Next, at step 86, the base 56 is mounted on the machine tool 24 at the desired location, such as near or over the spindle head assembly 44. At step 88, the collar 66 along with the angled machine head 22 is rotated to position the head 22, and thus the tool 26 in a desired orientation. At step 90, the collar 66 is locked in the selected rotational position by tightening the screws 74 which draws the flange 70 tightly down against the face 56a of the base 56. At this point, as shown at step 92, the angled machine head 22 may be powered up using the fluid drive system 34.

With the angled machine head 22 held in a fixed position on the machine tool 24 by the fixture 22, machining operations may be performed in which the workpiece 28 and/or the tool 26 are moved relative to each other to carryout machining operations under the control of the controller 32. The position of the tool 26 relative to the workpiece 28 may be established before machining operations are commenced by programming into the controller 32 the position of the central rotational axis 38 of the fixture 20. Alternatively, where the fixture 20 is positioned over the spindle assembly 44 such that the rotational axis 38 of the fixture 22 is coaxial with that of the spindle (not shown) in the spindle assembly 44, the known location of the spindle axis may be used as a reference for determining the position of the tool 26 with the machine's coordinate system 25.

Figure 11:
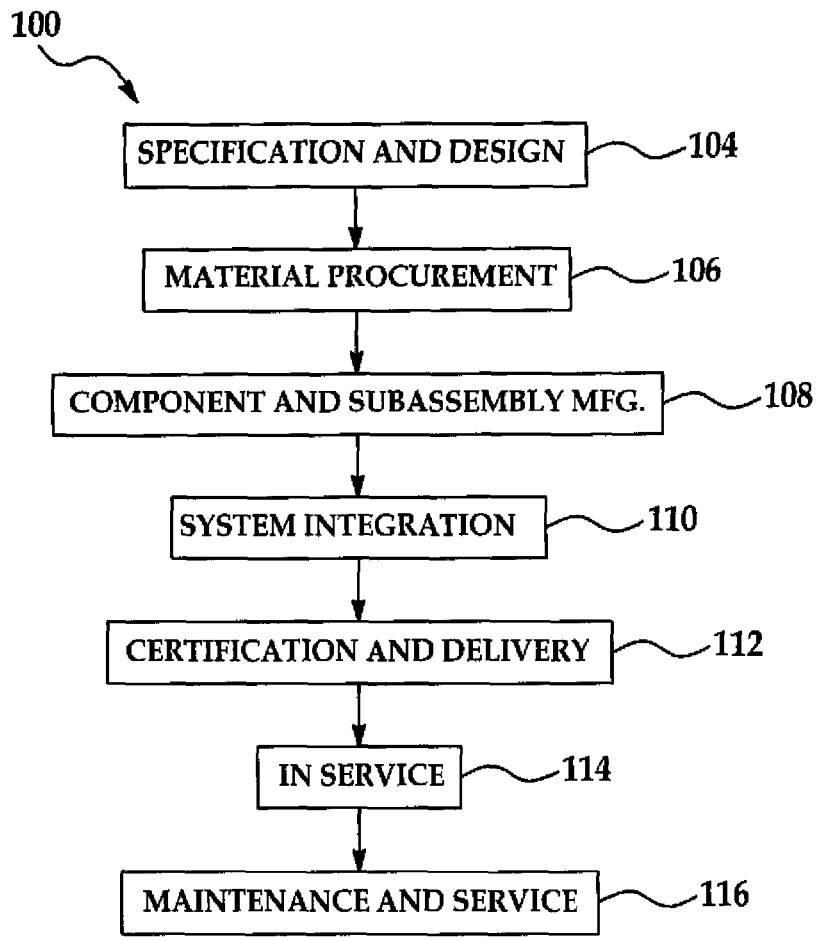
FIG. 11 is a flow diagram of aircraft production and service methodology.
Figure 12:
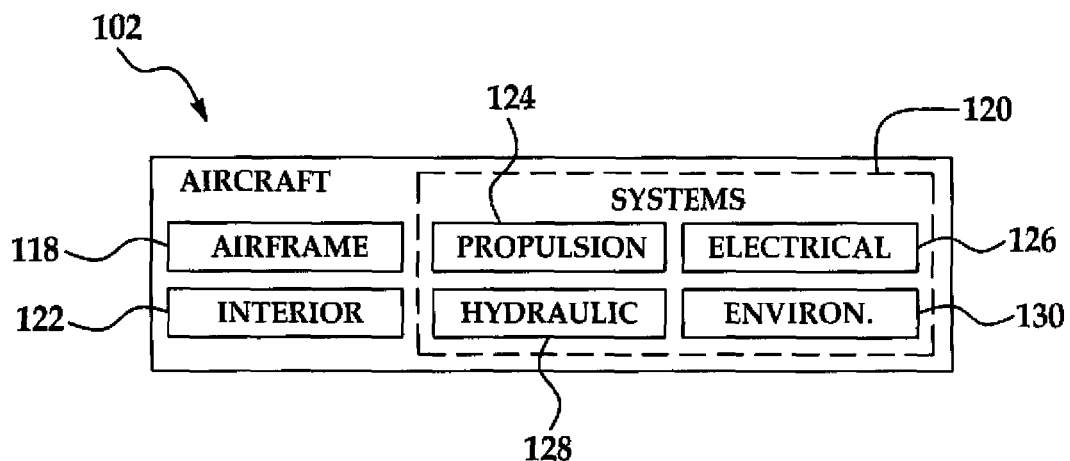
FIG. 12 is a block diagram of an aircraft.

Embodiments of the disclosure may find use in a variety of potential applications, particularly in the transportation industry, including for example, aerospace and automotive applications. Thus, referring now to FIGS. 11 and 12, embodiments of the disclosure may be used in the context of an aircraft manufacturing and service method 100 as shown in FIG. 11 and an aircraft 102 as shown in FIG. 12. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 100 may include specification and design 94 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 90 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 98 may be fabricated or manufactured in a manner similar to components or subassemblies produced while the aircraft 92 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A fixture for mounting an angled machine head on a machine tool, comprising:
    a base to be mounted on the machine tool;
    a collar for holding the angled machine head, the collar being mounted for rotation on the base about a reference axis and to enable the angled machine head to be rotated to any of a plurality of rotational positions about the reference axis;
    means for selectively locking the collar against rotation on the base; and
    shims between the angled machine head and the collar for securing the angled machine head within the collar.

2. The fixture of claim 1, wherein:
    the collar includes at least two arcuate slots therein, and
    the means for selectively locking includes fasteners passing through the slots into the base.

3. The fixture of claim 2, wherein:
    the collar includes a flange engaging the base, and
    the slots are defined in the flange.

4. The fixture of claim 1, further including fasteners extending through the collar into contact with the shims for forcing the shims against the angled machine head.

5. The fixture of claim 1, wherein:
    the collar includes a substantially hollow cylinder, including curved interior wall portions, and
    the shims possess a curvature generally matching the curvature of the curved interior wall portions of the collar.

6. The fixture of claim 1, wherein the shims include first and second shims disposed on opposite sides of the angled machine head.

7. A fixture for mounting an angled machine head on a machine tool, comprising:
    a base to be mounted on the machine tool;
    a collar for holding the angled machine head, the collar being mounted for rotation on the base about a reference axis and to enable the angled machine head to be rotated to any of a plurality of rotational positions about the reference axis; and
    means for selectively locking the collar against rotation on the base, wherein the base comprises a bracket to be removably mounted on the machine tool.

8. The fixture of claim 7, wherein the collar includes a cutout therein, and
    the angled machine head is to pass through the cutout.

9. The fixture of claim 7, further comprising one or more shims to be positioned between the angled machine head and the collar to secure the angled machine head within the collar.

10. A fixture for mounting an angled machine head on a machine tool having a spindle rotating about a reference axis, comprising:
    a base;
    means for mounting the base on the machine tool in an area of the spindle; and
    means for rotatably mounting the angled machine head on the base and overlying the spindle, including means for locking the angled machine head in any of a plurality of rotational positions respectively corresponding to different working orientations of the angled machine head, wherein the means for rotatably mounting the angled machine head on the base and overlying the spindle includes:

a collar, and shims between the collar and the angled machine head.

11. The fixture of claim 10, wherein:

the collar includes curved interior walls, and each of the shims includes a curved side engaging the curved walls and a substantially flat side engaging the angled machine head.

12. A fixture for mounting an angled machine head on a machine tool having a spindle rotating about a reference axis, comprising:

a base;

means for mounting the base on the machine tool in an area of the spindle; and means for rotatably mounting the angled machine head on the base and overlying the spindle, including means for locking the angled machine head in any of a plurality of rotational positions respectively corresponding to different working orientations of the angled machine head, wherein the base is U-shaped and overlies the spindle.

13. The fixture of claim 12, wherein:

the means for rotatably mounting the angled machine head on the base and overlying the spindle includes a flange engaging the base, the flange including a plurality of arcuate slots therein, and the means for locking includes fasteners passing through the slots into the base for drawing the flange against the base.

14. A fixture for mounting a right angle machine head on a machine tool having a spindle rotating within a spindle housing, comprising:

a base to be removably mounted on the spindle housing;

a collar for holding the right angle machine head, the collar being rotatable on the base about a reference axis generally aligned with the rotational axis of the spindle and to enable the right angle machine head to be rotated to any of a plurality of rotational positions about the reference axis;

shims between the right angle machine head and the collar for fitting the right angle machine head to the collar;

a circular flange on an end of the collar, the flange overlying and engaging the base, the flange including a plurality of arcuate slots therein extending around the collar;

a plurality of fasteners respectively passing through the slots into the base for releasably locking the flange to the base; and a fluid power system independent of the machine tool for powering the right angle head.

* * * * *